United States Patent [19]

Re Fiorentin et al.

[11] Patent Number: 4,935,727
[45] Date of Patent: Jun. 19, 1990

[54] DEVICE FOR MEASURING THE QUANTITY OF LIQUID CONTAINED IN A TANK

[75] Inventors: Stefano Re Fiorentin, Grugliasco; Piero Tonello, Cigliano, both of Italy

[73] Assignee: Fiat Auto S.p.A., Turin, Italy

[21] Appl. No.: 226,040

[22] Filed: Jul. 29, 1988

[30] Foreign Application Priority Data

Jul. 31, 1987 [IT] Italy ............................ 67672 A/87

[51] Int. Cl.$^5$ ............................................. G08B 21/00
[52] U.S. Cl. ................................... 340/618; 340/450; 73/304 R; 361/284
[58] Field of Search .............. 340/59, 618, 620, 622, 340/450, 450.2, 450.3; 73/304 R, 304 C; 361/284

[56] References Cited

U.S. PATENT DOCUMENTS

| | | |
|---|---|---|
| 2,357,023 | 8/1944 | Reid et al. .......................... 73/304 C |
| 4,059,016 | 11/1977 | Kitzinger et al. .................. 73/304 R |
| 4,176,553 | 12/1979 | Wood ................................... 361/284 |
| 4,194,395 | 3/1980 | Wood ................................... 361/284 |
| 4,417,473 | 11/1983 | Tward et al. ....................... 73/304 C |
| 4,553,216 | 11/1985 | Stevens et al. ..................... 364/558 |
| 4,589,077 | 5/1986 | Pope ..................................... 361/284 |
| 4,619,140 | 10/1986 | Kühnel ................................ 73/304 R |

FOREIGN PATENT DOCUMENTS

| | | |
|---|---|---|
| 0184687 | 6/1986 | European Pat. Off. . |
| 0277882 | 7/1987 | European Pat. Off. . |
| 2649580 | 9/1978 | Fed. Rep. of Germany . |
| 2383436 | 6/1978 | France . |

OTHER PUBLICATIONS

Patent Abstracts of Japan, vol. 10, No. 274, p. 498, 2330, Sep. 18, 1986.
JP-A-61 96 415, (Sumitomo Electric Ind. Ltd.), 15-05-1986.

Primary Examiner—Joseph A. Orsino
Assistant Examiner—Jeffery A. Hofsass
Attorney, Agent, or Firm—Albert L. Jeffers; David L. Ahlersmeyer; John F. Hoffman

[57] ABSTRACT

A device for measuring the quantity of light in a tank is disclosed, including three level sensors housed within a tank in a predetermined relative position. Alternative processors are disclosed for processing information supplied by the level sensor, wherein the information depends on the liquid level sensed by each of the sensors. An indicator, controlled by the processor, indicates the quantity of liquid contained in the tank.

8 Claims, 2 Drawing Sheets

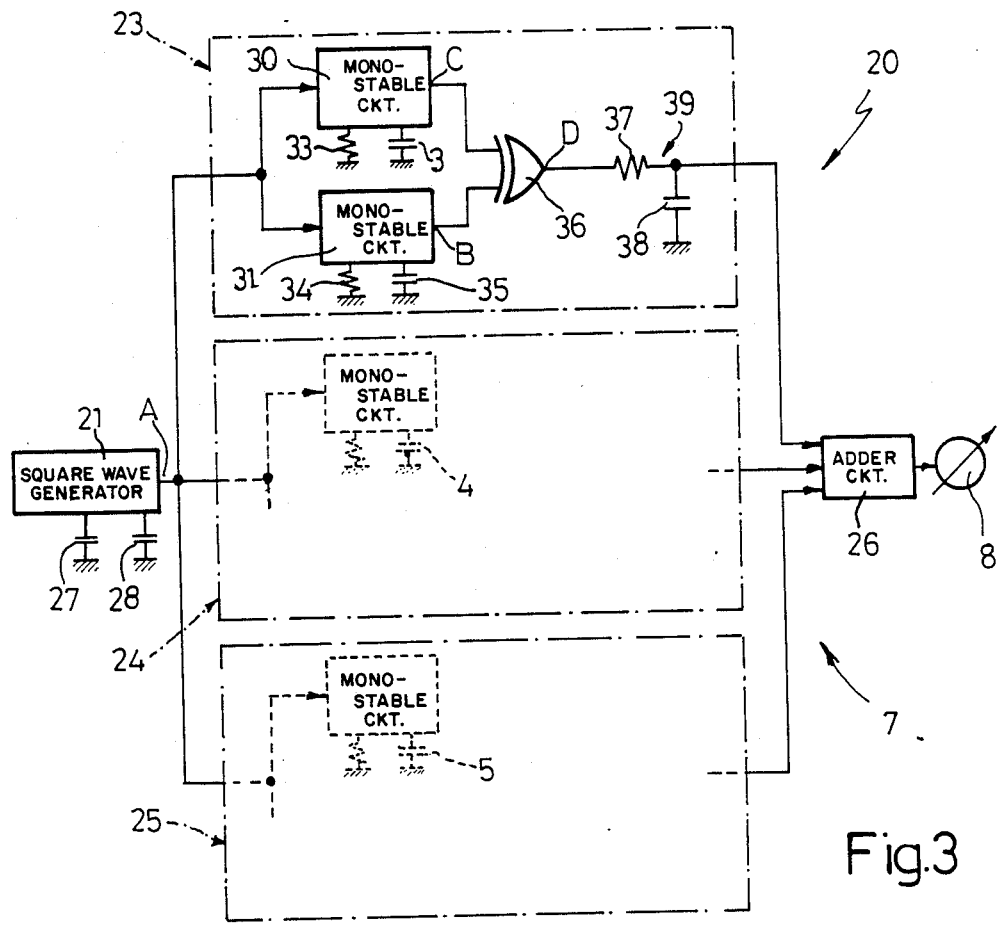
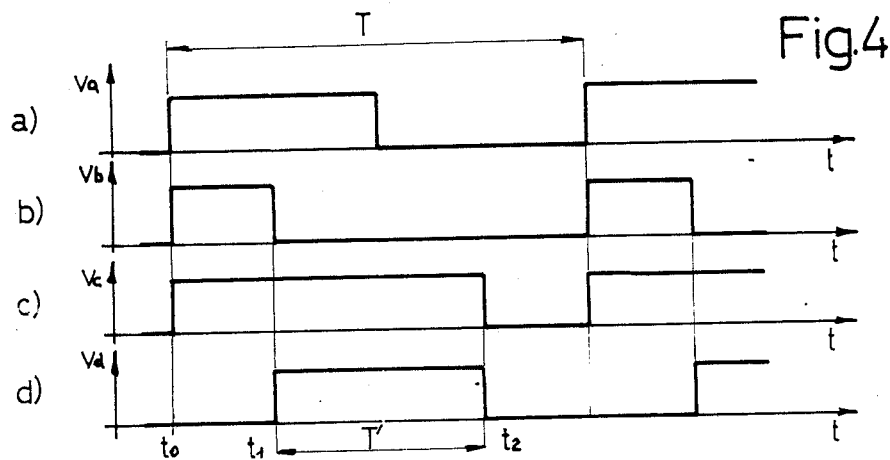
Fig.3
Fig.4

DEVICE FOR MEASURING THE QUANTITY OF LIQUID CONTAINED IN A TANK

BACKGROUND OF THE INVENTION

This invention relates to a device for measuring the quantity of liquid contained in a tank.

Particularly, but not exclusively, the invention relates to a device for measuring the quantity of fuel contained in a motor vehicle tank.

Currently, the quantity of fuel contained in a motor vehicle tank is generally measured by devices which sense its level along a segment rigid with the tank in a predetermined position. If this position is not barycentric, or if the tank shape is not uniform, the correlation between level and liters is altered by variations in the inclination to the horizontal plane or by vehicle acceleration.

In order to make the reading less sensitive to inclination, devices have been proposed using a microprocessor on board the vehicle, so as to read the fuel level when the vehicle is at rest, and to subsequently update this reading by measuring the instantaneous fuel consumption. However, even in this latter case inclination errors can occur due both to the fact that the reference reading is not always taken with the vehicle on the level, and that the evaluation of instantaneous fuel consumption is still rather approximate.

SUMMARY OF THE INVENTION

The object of the present invention is to provide a device for measuring the fuel quantity in a tank, which is subject to the least possible variation with changes in attitude and state of movement of the tank itself.

Said object is attained according to the present invention by a device for measuring the quantity of liquid in a tank, characterised by comprising:

three level sensors to be housed within said tank in a predetermined relative position;

means for processing information supplied by said level sensors apt to implement, in use, a suitable function of the three liquid level values detected from said level sensors, said function being apt to supply the value of the amount of the liquid within the tank independently of the inclination of said tank; and indicator means controlled by said processing means for indicating the quantity of liquid contained in said tank.

BRIEF DESCRIPTION OF THE DRAWINGS

The invention will be more apparent from the description of some embodiments thereof given hereinafter by way of non-limiting example with reference to the accompanying drawings, in which:

FIG. 3 is a diagrammatic view of a second embodiment of the device of FIG. 1;

FIG. 4 shows the pattern of some wave forms of electrical signals taken from respective points of the device of FIG. 3.

DETAILED DESCRIPTION OF THE INVENTION

Figure 1:
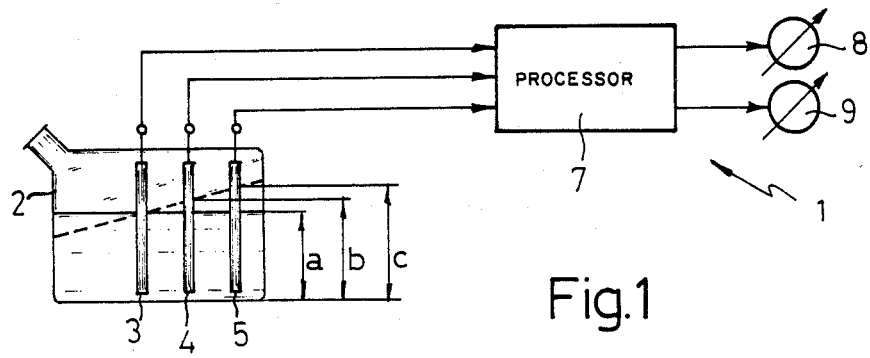
FIG. 1 is a diagrammatic view of a measuring device constructed in accordance with the present invention and shown in one example of application.

In FIG. 1, the reference numeral 1 indicates overall a device for measuring the quantity of liquid contained in a tank 2.

Particularly, but not exclusively, the device 2 can be used for measuring the quantity of fuel contained in a motor vehicle tank.

Specifically, the device 1 comprises essentially:

three level sensors 3, 4, 5 to be housed within the tank 2 in a predetermined relative position;

means 7 for processing information supplied by said level sensors which depends, when in use, on the liquid level sensed by each of them; and indicator means 8, 9 controlled by the processing means 7 for indicating the quantity of liquid contained in the tank 2 and, respectively, the inclination of the tank 2 (and thus of the vehicle) to a reference plane (for example the horizontal plane).

Conveniently, the sensors 3, 4, 5 are disposed along a circumference and spaced angularly apart by 120°.

Figure 2:
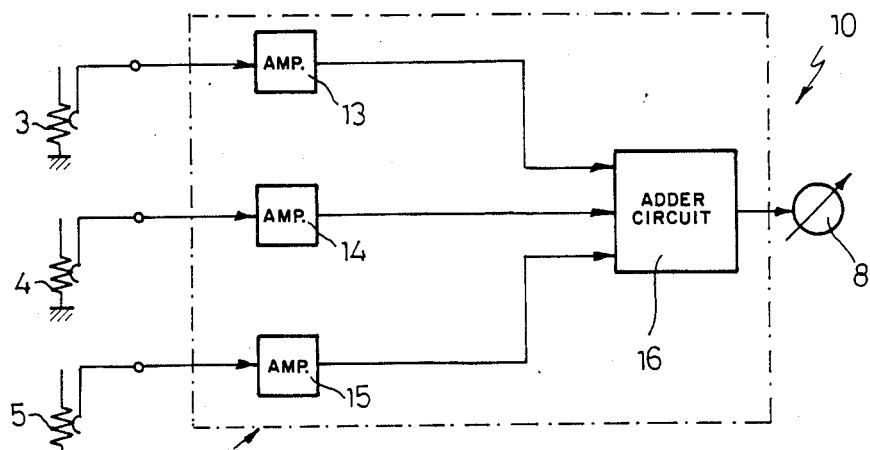
FIG. 2 is a diagrammatic view of a first embodiment of the device of FIG. 1.
Figure 5:
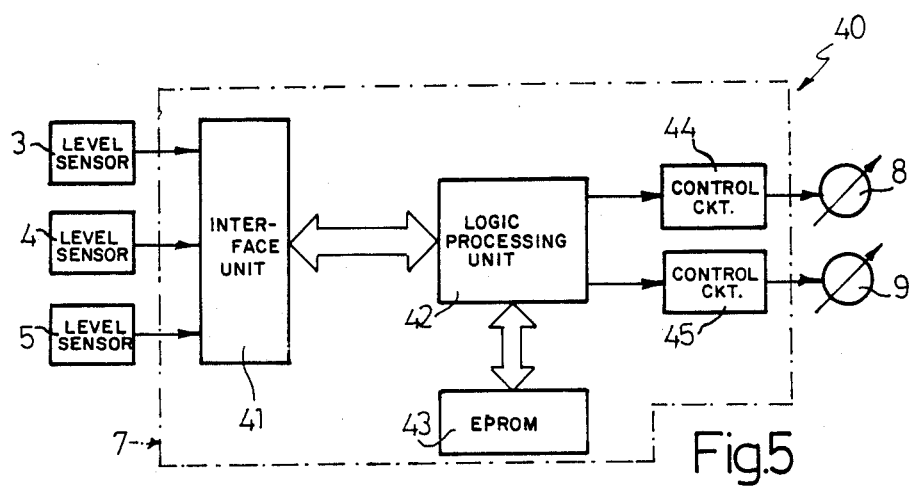
FIG. 5 is a diagrammatic view of a third embodiment of the device of FIG. 1.

FIGS. 2, 3 and 5 show in greater diagrammatic detail the measuring devices 10, 20 and 40 which constitute equivalent embodiments of the device 1. For this reason, the same reference numerals are used to indicate components which are identical or operationally equivalent.

With particular reference to FIG. 2, the device 10 uses as level sensors variable resistors, each of which has its slider connected to a respective amplifier 13, 14, 15 having its respective output connected to a corresponding input of an adder circuit 16. The output of this latter is connected to the fuel quantity indicator 8.

With particular reference to FIG. 3, the device 20 uses as level sensors capacitors connected into three respective conditioning circuits 23, 24, 25 which are connected together in parallel and interposed between a square wave generator 21 and an adder circuit 26, the output of which is connected to said liquid quantity indicator 8.

More specifically, the square wave generator 21 has an oscillation period T (see the signal Va of FIG. 4a) proportional to the difference between capacities of the capacitors 27 and 28 which are connected to it externally.

The capacitor 27, of suitable form, is located in the tank 2 such that its plates are immersed in the liquid, which thus forms the dielectric. The capacitance of this capacitor is therefore directly proportional to the dielectric constant of the liquid.

The capacitor 28 is chosen in such a way to have the same capacity of the capacitor 27 when the dielectric of this latter is air.

In this manner:

$$T = K1(Er - 1) \tag{1}$$

where:

Er is the relative dielectric constant of the liquid

K1 is a proportionality constant.

The circuits 23, 24 and 25 are identical and for this reason only the conditioning circuit 23 is described hereinafter in detail.

The circuit 23 comprises essentially a pair of monostable circuits 30, 31 having common inputs and having their outputs connected to respective inputs of a logic gate 36 of EX-OR type. At time t0, the signal Va generated by the astable circuit 21 triggers both the output signals Vb and Vc (see FIGS. 4b and 4c) of the monostable circuits 30 and 31.

The switching time t2 of the monostable circuit 30 is determined by a resistor 33, the resistance of which is hereinafter indicated by R(33), and by the capacitor 3, the capacitance C(3) of which depends on the fuel level in the tank 2.

The switching time t1 of the monostable circuit 31 is fixed, and is determined by a resistor 34 and capacitor 35.

The resistance (R34) of the resistor 34 and the capacitance C(35) of the capacitor 35 are chosen such that under dry conditions the following relationship is valid:

$$R(33)C(3) = R(34)C(35)$$

In this manner, when the tank is empty t2=t1, whereas when fuel is present t2>t1.

The comparison between the signals Vb and Vc produces at the output of the logic gate 36 the signal, the duration T' of which is the difference between the duration t2 of the signal Vc and the duration t1 of the signal Vb, and is directly proportional to the level of the liquid between the opposing plates of the capacitor 3 (and therefore to the respective wetted area A), in that the portion of duration t1, which is also present when liquid is absent between the plates, is subtracted from the signal Vc. This portion in fact depends on the capacitance of the capacitor when it has air as its dielectric.

Thus:

$$T' = R(33)C(3) - R(34)C(35) = K2A(Er-1) \quad (2)$$

where K2 is a proportionality constant.

The output of the logic gate 36 is connected to a respective input of the adder 26 by way of a conventional filter 39 formed from a resistor 37 and capacitor 38.

The filter 39 provides the mean value of the signal Vd, expressed by the relationship:

$$<Vd> = \frac{1}{T} \int_0^T Vd(t)dt = Vcc \frac{T'}{T} \quad (3)$$

where Vcc is the voltage relative to the logic value "1" of the signal Vd (for example +5 V).

Using the equations (1) and (2), (3) becomes:

$$<Vd> = Vcc \frac{K2 \, A(Er-1)}{K1(Er-1)} = K3 \, A \quad (4)$$

In other words, the voltage fed to the adder 26 is directly proportional (by a constant which does not depend on the nature of the dielectric) to the electrode area wetted by the liquid. With particular reference to FIG. 5, the measuring device 40 illustrated therein uses preferably identical generic level sensors 3, 4, 5 which, by way of an interface unit 41, are connected to a logic processing unit 42 conveniently comprising a microprocessor. The unit 42 exchanges information with a programmable read-only memory 43 (for example of EPROM type), and controls the indicators 8 and 9 by means of respective control circuits 44 and 45.

Before describing the operation of the aforesaid measuring devices, some theoretical considerations will be given. If for a particular tank the following function is known:

liters contained = $f(a, b, c)$ where a, b, c are the liquid levels at three predetermined points of the tank (see FIG. 1), by measuring the three values a, b, c it is possible to obtain an accurate evaluation of the liquid quantity, independently of the attitude of the container, provided suitable computing means are available.

The idea on which the present invention is based consists of evaluating the function f (and thus the liquid quantity) by the simple analog addition of the signals provided by three sensors, each structured such that the output signal is a precise function of the height wetted by the liquid.

In particular, the three functions f(a), f(b), f(c) which characterise the three sensors must be such that their sum f(a)+f(b)+f(c) approximates as closely as possible to the function f(a, b, c). Conveniently, polynomials of a sufficiently high order are chosen for these three functions, their coefficients being determined by regression on the function f(a, b, c) measured experimentally.

On this basis, it is apparent that in principle and with particular reference to FIG. 1 the measuring device according to the present invention can be structured in two different ways. More precisely, the sensors 3, 4 and 5 can either be suitably shaped according to the shape of the tank and their arrangement in the tank (in which case the processing means 7 need only be able to compute algebraic additions), or can be all identical (in which case the processing means 7 must be able to carry out the operations necessary to obtain the said three functions).

The device 10 of FIG. 2 pertains to the first of the said cases, the resistors 3, 4, 5 being suitably shaped and the signal emitted by them being added algebraically in the adder 16 after suitable amplification in the respective amplifiers 13, 14, 15.

The device 20 of FIG. 3 also pertains to the first case, in which the signals Vd are added in the adder 26 after undergoing processing consisting essentially of compensation for the liquid dielectric constant (by the frequency of the circuit 21), subtraction of the empty signal Vb by the logic gate 36, and subsequent filtration through the circuit 39.

The device 40 of FIG. 5 can pertain either to the first case (shaped sensors) or to the second case (identical sensors). However, it is apparent that as the computing capacity of the unit 42 is available it is more convenient to use identical sensors and feed into the memory 43 all the information necessary to calculate the said functions f(a), f(b) and f(c). In this case, the inclination of the vehicle in which the tank 2 is fitted can also be calculated, by using the signals generated by the sensors 3, 4 and 5 which have already been used for calculating the fuel quantity.

The advantages obtained by the devices constructed in accordance with the present invention are apparent from an examination of their characteristics.

Firstly, the fuel quantity can now be indicated with high precision whatever the inclination or state of movement of the respective tank. Moreover, secondary information regarding the attitude of the tank (and consequently of the vehicle) can be obtained without any significant cost increase in the device. Finally, the device 40 of FIG. 5 is particularly advantageous both from the initial installation and from the spares aspect, in that it requires a reduced stock availability as the sensors are all identical, so that to prepare such a device only a base portion, which is always identical, and a memory 43, which is set for the particular tank in which the device is to be installed, need be provided.

Finally, it is apparent that modifications can be made to the described devices but without leaving the present invention. For example, the level sensors could also be of a different type, such as electrothermal. Furthermore, these devices could be used for measuring the quantity of any liquid contained in tanks of any shape which are subject to variations in attitude or state of movement.

We claim:

1. A device for measuring the quantity of a liquid in a single tank, comprising:

three identical level sensors to be housed in respective predetermined relative positions within said tank, each sensor generating a respective output signal depending on the respective value (a, b, or c) of the liquid level in said respective predetermined position within said tank;

processing means for processing said respective output signals supplied by said level sensors to generate an output signal depending on the quantity of the liquid within said single tank independently of the inclination of said tank, said processing means comprising means for implementing respective polynomial single functions (f(a), f(b), f(c)) corresponding to said respective output signals, and means for adding said respective single functions, whereby the sum of said respective single functions (f(a), f(b), f(c)) approximates to a function (f(a, b, c)) that gives the amount of the quantity of liquid contained in said tank when the values (a, b, c) of the liquid levels measured by said three liquid sensors are known, the coefficients of said respective polynomial single functions ((f(a), f(b), f(c)) being determinable by a regression of said function (f(a, b, c)) measured experimentally for said tank; and indicator means, supplied by said output signal generated by said processing means, for indicating the quantity of liquid contained in said tank.

2. A device as claimed in claim 1, characterized in that said sensors are positioned along a circumference.

3. A device as claimed in claim 1, characterized in that said sensors are positioned angularly equidistant 120° apart along said circumference.

4. A device as claimed in claim 1, characterized in that said sensors consist of variable resistors, in which the slider position is determined by the level reached by said liquid.

5. A device as claimed in claim 1, characterized in that said sensors are of electrothermal type.

6. A device as claimed in claim 1, characterized in that said sensors consist of capacitors provided with mutually facing plates arranged to be wetted by said liquid when in use, and said processing means comprise respective compensation capacitors arranged to compensate for the residual capacitance of said capacitors when liquid is absent in said tank.

7. A device as claimed in claim 1, and further characterized by indicator means controlled by said processing means to indicate, when in use, the inclination of said tank to a reference plane.

8. A device as claimed in claim 1, characterized in that said liquid is fuel and said tank is a vehicle tank.

* * * * *